United States Patent
Brahmer (10) Patent No.: US 11,002,266 B2
(45) Date of Patent: May 11, 2021

(54) METHOD FOR REGULATING THE OUTPUT PRESSURE OF A HYDRAULIC DRIVE SYSTEM, USE OF THE METHOD AND HYDRAULIC DRIVE SYSTEM

(71) Applicant: Voith Patent GmbH, Heidenheim (DE)

(72) Inventor: Bert Brahmer, Bruchsal (DE)

(73) Assignee: Voith Patent GmbH, Heidenheim (DE)

( * ) Notice: Subject to any disclaimer, the term of this patent is extended or adjusted under 35 U.S.C. 154(b) by 0 days.

(21) Appl. No.: 16/779,109

(22) Filed: Jan. 31, 2020

(65) Prior Publication Data

US 2020/0166029 A1 May 28, 2020

Related U.S. Application Data

(63) Continuation of application No. PCT/EP2018/070833, filed on Aug. 1, 2018.

(30) Foreign Application Priority Data

Aug. 3, 2017 (DE) ...................... 10 2017 117 595.4

(51) Int. Cl.
  *F04B 49/06* (2006.01)
  *B21D 24/14* (2006.01)
  *F04B 17/03* (2006.01)
(52) U.S. Cl.
  CPC .............. *F04B 49/06* (2013.01); *B21D 24/14* (2013.01); *F04B 17/03* (2013.01)
(58) Field of Classification Search
  USPC ....................................................... 417/44.2
  See application file for complete search history.

(56) References Cited

U.S. PATENT DOCUMENTS

| 5,553,589 A | 9/1996 | Middleton et al. |
| 6,379,119 B1 | 4/2002 | Truninger |

(Continued)

FOREIGN PATENT DOCUMENTS

| DE | 698 30 633 T2 | 5/2006 |
| DE | 603 14 178 T2 | 1/2008 |

(Continued)

OTHER PUBLICATIONS

Notification of the Transmission of the International Search Report and Written Opinion of the International Search Authority or Declaration dated Oct. 24, 2018 for International Application No. PCT/EP2018/070833 (12 pages).

(Continued)

*Primary Examiner* — Michael Leslie
*Assistant Examiner* — Michael Quandt
(74) *Attorney, Agent, or Firm* — Taylor IP, P.C.

(57) ABSTRACT

A method for regulating output pressure of a hydraulic drive system by using a rotational speed as the actuating variable. The method includes determining a setpoint rotational speed main component of motor drive as a pilot control signal, determining an error rotational speed as a regulating deviation from a comparison of an actual pressure value of the hydraulic drive system and a setpoint pressure value of the hydraulic drive system and adjoining regulating amplifier, adding the determined setpoint rotational speed main component to the determined error rotational speed to create the setpoint rotational speed as the actuating variable, and converting the created setpoint rotational speed into an input rotational speed of the motor drive to drive the hydraulic drive system at the converted rotational speed in order to generate regulated output pressure of the hydraulic drive system which represents actual pressure value.

6 Claims, 8 Drawing Sheets

(56) References Cited

U.S. PATENT DOCUMENTS

| | | | |
|---|---|---|---|
| 6,537,032 B1 * | 3/2003 | Horiuchi | F04D 15/0066 |
| | | | 417/18 |
| 6,971,302 B2 | 12/2005 | Lee | |
| 7,036,345 B2 * | 5/2006 | Satou | B21D 5/02 |
| | | | 100/257 |
| 8,757,056 B2 * | 6/2014 | Kohno | B21D 24/14 |
| | | | 100/50 |
| 9,035,588 B2 | 5/2015 | Hano et al. | |
| 9,180,868 B2 | 11/2015 | Yoshida et al. | |
| 2009/0097986 A1 * | 4/2009 | Nakata | F15B 11/0423 |
| | | | 417/44.2 |
| 2018/0073498 A1 | 3/2018 | Behrendt | |
| 2018/0117656 A1 * | 5/2018 | Kohno | B21D 24/14 |

FOREIGN PATENT DOCUMENTS

| | | |
|---|---|---|
| DE | 698 37 877 T2 | 2/2008 |
| DE | 10 2011 121 837 A1 | 6/2013 |
| DE | 10 2012 009 136 A1 | 11/2013 |
| DE | 10 2015 207 682 A1 | 10/2016 |
| WO | 2010/121712 A1 | 10/2010 |

OTHER PUBLICATIONS

German Office Action dated Mar. 22, 2018 for German Application No. 10 2017 117 595.4 (10 pages).

Machine translation of the Notification of the Transmission of the International Search Report and Written Opinion of the International Search Authority or Declaration dated Oct. 24, 2018 for International Application No. PCT/EP2018/070833 (14 pages).

* cited by examiner

Fig. 1 – State of the art

Fig. 3 – State of the art

Fig. 2 – State of the art

100

```
┌─────────────────────────────────────────┐  101
│ Determining a setpoint rotational speed │ /
│ component as pilot control signal       │
└─────────────────────────────────────────┘
                    │
                    ▼
┌─────────────────────────────────────────┐  102
│ Determining an error rotational speed as│ /
│ regulating deviation                    │
└─────────────────────────────────────────┘
                    │
                    ▼
┌─────────────────────────────────────────┐  103
│ Adding and creating a setpoint rotational│ /
│ speed as actuating variable             │
└─────────────────────────────────────────┘
                    │
                    ▼
┌─────────────────────────────────────────┐  104
│ Converting of the created setpoint      │ /
│ rotational speed into operating rotational│
│ speed to produce a controlled output    │
│ pressure                                │
└─────────────────────────────────────────┘
```

Fig. 7

METHOD FOR REGULATING THE OUTPUT PRESSURE OF A HYDRAULIC DRIVE SYSTEM, USE OF THE METHOD AND HYDRAULIC DRIVE SYSTEM

CROSS REFERENCE TO RELATED APPLICATIONS

This is a continuation of PCT application No. PCT/EP2018/070833, entitled "METHOD FOR REGULATING THE OUTPUT PRESSURE OF A HYDRAULIC DRIVE SYSTEM, USE OF THE METHOD AND HYDRAULIC DRIVE SYSTEM", filed Aug. 1, 2018, which is incorporated herein by reference.

BACKGROUND OF THE INVENTION

1. Field of the Invention

The present invention relates to a method for regulating the output pressure of a hydraulic drive system, use of the method, and a hydraulic drive system. The present invention may be used for hydraulic systems in pull-push forming devices, for example in a deep drawing device, preferably for active hydromechanical drawing.

2. Description of the Related Art

A hydraulic drive system, also referred to as a hydraulic drive can be produced by using a pump and a variable speed drive. Herein, the fluid flow from or respectively to an actuator, for example a hydraulic cylinder is regulated directly through the utilized pump and not through switching valves or continuous flow valves. A system consisting of hydraulic pump, motor drive and an amplifier operating the motor drive with frequency converter is subsequently referred to as hydraulic drive system. Colloquially this hydraulic drive system is also referred to as "servo pump".

The hydraulic drive system can be used to produce a regulated output volume flow. Based on this, a speed or position control of an actuator—subsequently also referred to as a cylinder—can be provided. This actuator can in turn be used to move elements of a machine tool, for example a die cushion in a drawing device.

This hydraulic drive system can also be used to produce a controlled output pressure. Based on this, a force control can be provided.

DE 698 37 877 T2, DE 603 14 178 and DE 698 30 633 T2 each describe a control loop for a hydraulic pump for a construction machine, for example an excavator. For this purpose hydraulic pumps are equipped with controllers. Servo valves regulate the pressure of a control pressure pump. The drive unit is a diesel engine. A control unit is provided for control of the hydraulic pump. This control unit receives a setpoint rotational speed, in other words an input value and measures an actual speed. Driver flows for the hydraulic pump are issued by way of arithmetic operation. Based on the setpoint rotational speed a base torque is calculated by way of stored charts. A deviation from the rotational speed is calculated and subsequently enhanced in order to obtain a torque deviation. The setpoint rotational speed is predetermined, and the actual speed is measured in order to regulate a flow. Tachometers are expensive and inaccurate. Non-linear malfunctions are therein not considered.

DE 10 2011 121 837 A1 describes a method to operate variable speed pumps, and a variable speed pump. Control occurs by predetermining of a target pressure p.target. Actual pressure p.is, is also considered in the control. A pressure regulating device provides the target rotational speed n-target to a speed regulating device. An I-control circuit follows the speed regulating device. The drive device of the pump is controlled on the basis of values controlled by these control circuits. The actual volume flow supplied by the pump depends herein also on the compression module of the oil—E.oil as well as on the leakage flow. An adaptive, self-learning compensation algorithm and a teaching module for operating the pump can herein be provided.

U.S. Pat. No. 6,379,119 B1 describes the use of a hydraulic drive system for regulating a deep drawing device by way of regulating the die cushion force. The therein described control method is based on an idealized linear relationship between the pressure, a conveying volume of the pump that is determined by its size and a driving torque at the hydraulic pump. From the determination of setpoint and actual pressure values, the electric current for the motor drive is determined as control variable. The pressure control considers herein only the pump characteristics. This leads to a usable pressure control, as long as no appreciable volume flow reduction occurs.

In the current state of the art, it has hitherto not been considered that the necessary rotational speed depends not only on the setpoint and actual pressure, but also on the actually required volume flow for movement of the actuator, for example for the support of the die cushion. The method of pressure regulation described in the current state of the art is disadvantageous for a user with significant and variable volume flow in as far as regulating the pressure for large work areas is too inaccurate.

A torque control moreover has the setpoint and actual torque as the input value and produces a current setpoint for the motor current as an actuating signal. As a model for the actual torque the actual current is used, since an accurate torque measurement in practice is not feasible or requires very expensive torque sensors. In actual fact therefore, current control and no torque control is implemented.

What is needed in the art is an output pressure control for a hydraulic drive system which remains stable and accurate even with variable volume flow and/or wide value ranges of the output pressure of the hydraulic pump.

SUMMARY OF THE INVENTION

The present invention provides a method for regulating the output pressure of a hydraulic drive system by using a rotational speed as the actuating variable, wherein the hydraulic drive system has a hydraulic pump and a motor drive which drives the hydraulic pump. The method regulates the output pressure precisely, dynamically, and with low vibration in a drawing process of a deep draw procedure. The method comprises the following process steps: determining a setpoint rotational speed main component of the motor (or respectively electromotive) drive as a pilot control signal, determining an error rotational speed as a regulating deviation from a comparison of an actual pressure value of the hydraulic drive system and a setpoint pressure value of the hydraulic drive system and adjoining regulating amplifier, adding of the determined setpoint rotational speed main component to the determined error rotational speed in order to form a setpoint rotational speed as an actuating variable, and converting of the formed setpoint rotational speed into an input rotational speed of the motor drive in order to drive the hydraulic drive system at the converted rotational speed in order to generate the regulated output pressure of the hydraulic drive system which represents the actual pressure value. The actual pressure value is determined in particular by way of a pressure sensor.

The inventive hydraulic pump operates in the inventive method, for example in at least two operating states. In the first operating state, the pump operates in its function as a pump by generating a regulated output pressure. In a second operating state, the pump operates as a hydro-motor by taking in fluid which is possibly necessary depending on a device which is to be driven. In both operating states an actuator should be moved into a certain position or to be integrated with an element influencing the hydraulic drive system. These two operating conditions are preferably included within different time segments in the inventive method.

The inventive motor drive serves to drive the hydraulic pump. The drive is herein may be an electromotive drive, for example an asynchronous motor or a synchronous motor, preferably a three phase a.c. motor.

According to the invention, this motor drive is operated with a power amplifier and with a frequency converter.

The inventive setpoint rotational speed main component provides a rotational speed value which deviates nominally, for example no more than 20% from the setpoint rotational speed value which is to be set.

This allows for a rough adjustment of the setpoint rotational speed and the adjustment range is thus drastically reduced.

The inventive output pressure control influences the output pressure in as far as also non-linear malfunctions, friction and leaks can be captured as disturbance variables.

According to the invention, regulating the output pressure does not occur via the torque of the driving motor—for example a motor drive—but regulating occurs advantageously through the application of knowledge regarding the operating behavior of the hydraulic pump. The actuating variable for the motor drive is now no longer the electric current for regulating the motor drive, but according to the invention the rotational speed of the motor drive is used as the actuating variable.

The inventive rotational speed control includes the setpoint and actual rotational speed as the input value and generates a frequency as control signal for the rotating field that is to be produced by a frequency converter. In this context, the frequency is equated with the term "rotational speed setpoint".

For this purpose a setpoint rotational speed main component is initially generated or determined without the influence of disturbance variables as a pilot control signal. This happens for example by way of computers using parameters of the hydraulic drive system in the various operating states, for example generation of maximum pressure or pressureless operation. In an ideal system without frictions, leakages or other disturbances a hydraulic pump which is regulated only on the basis of this setpoint rotational speed main component could already lead to compensation of the disturbance variables.

According to the present invention, the error rotational speed—also referred to as corrective signal—is determined as control deviation from the setpoint pressure value (reference variable) and the actual pressure value (regulating variable) and adjoining regulating amplifier, for example a PI or PID controller. In addition, the actual pressure value is determined by way of a pressure sensor. This process step makes possible the compensation of lossy and non-linear characteristics such as compression and decompression effects in the hydraulic drive system. The necessary corrective signal is however small relative to the maximum possible rotational speed amplitude of the hydraulic drive system and can therefore be easily and robustly determined with the regulating amplifier. Since the error rotational speed does not illustrate the entire value range of the rotational speed of the hydraulic drive system, the amplification factors of the regulating amplifier can be robustly selected.

In the event that the hydraulic drive system is impacted by an external load—for example a force caused by a die cushion or a tool in a machine tool—the corrected rotational speed calculated from the comparison between setpoint pressure value and actual pressure value has a comparatively small part in the rotational speed control. The control arrangement according to the invention is therefore robust and precise.

The subsequent conversion of the setpoint rotational speed into the operating rotational speed occurs through the use of an amplifier and a frequency converter.

In one embodiment, the determined setpoint rotational speed main component comprises a first setpoint rotational speed component and a second setpoint rotational speed component, wherein the first setpoint rotational speed component is formed from a setpoint pressure value and wherein the second setpoint rotational speed component is formed from a volume flow setpoint of the hydraulic drive system. The volume flow—also referred to as flow rate—states the volume of fluid being moved per time period through an established cross section.

In another embodiment, the first setpoint rotational speed component is calculated from the setpoint pressure value, a maximum pressure of the hydraulic pump and a rotational speed parameter of the pump to produce the maximum pressure. The used hydraulic pump, for example a piston or geared pump offers high efficiency, also under pressure. To produce maximum pressure of the pump, typically only a very low rotational speed—for example 120 rpm—is necessary. These parameters are determined with blocked outlet of the hydraulic pump.

In another embodiment, the second setpoint rotational speed component is calculated from the volume flow setpoint and a conveyed volume flow parameter of the pump. This second setpoint rotational speed component is necessary to allow the hydraulic pump to accept or deliver the volume flow caused by the movement of the actuator. If the hydraulic pump were to be driven with this rotational speed, no pressure build-up would yet occur.

In another embodiment, the volume flow setpoint of the hydraulic drive system is determined by use of at least one parameter of an actuator that is driven by the hydraulic drive system, for example a cylinder. Conclusions can be reached in regard to the volume flow from a movement, for example of an element in a machine tool, caused by the hydraulic drive system.

In another embodiment, the at least one parameter is determined by way of sensor elements in order to calculate the second setpoint rotational speed component. The parameter is for example an actuator speed or an actuator travel path or respectively an element speed or an element travel path. By way of a simple calculation conclusions can be reached from this parameter, regarding the volume flow, thus considerably improving regulating of the output pressure.

In another embodiment, the calculation of the first setpoint rotational speed component and the second setpoint rotational speed component occurs with the correct algebraic sign designation. With a volume flow out of the conveying pump—in other words in the first operating state—the algebraic signs of the first and second setpoint rotational speed component are identically positive. With a volume flow into the pump operating as a hydro motor—in other words in the second operating state—the algebraic sign of the second setpoint rotational speed component is negative. Thus, the algebraic sign of the second setpoint rotational speed component is negative during deep drawing, because the fluid in the closed system is taken away in the direction of the hydraulic pump during the relevant movement of the actuator. In this process step the hydraulic pump functions as a hydro-motor and receives the fluid from the cylinder.

According to one aspect of the present invention, the previously described method is used for a hydraulic drive system in a pull-push device, for example a drawing device arranged for active hydromechanical deep drawing of one of more components.

According to another aspect of the present invention, in a hydraulic drive system designed to drive an actuator, for example an actuator in a deep drawing device, for example a draw cushion an output pressure of the hydraulic drive system is regulated according to the previously described method. The hydraulic drive system includes a hydraulic pump, a motor drive and an amplifier, for example a power amplifier with frequency converter.

In another embodiment, the hydraulic drive system is driven by the actuator or the hydraulic drive system is impacted by an additional actuator, for example by an upper or lower tool of the deep draw device. The actuator or additional actuator herein includes a sensor element to determine a movement parameter of the actuator. The parameter is used for determining the setpoint rotational speed main component.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
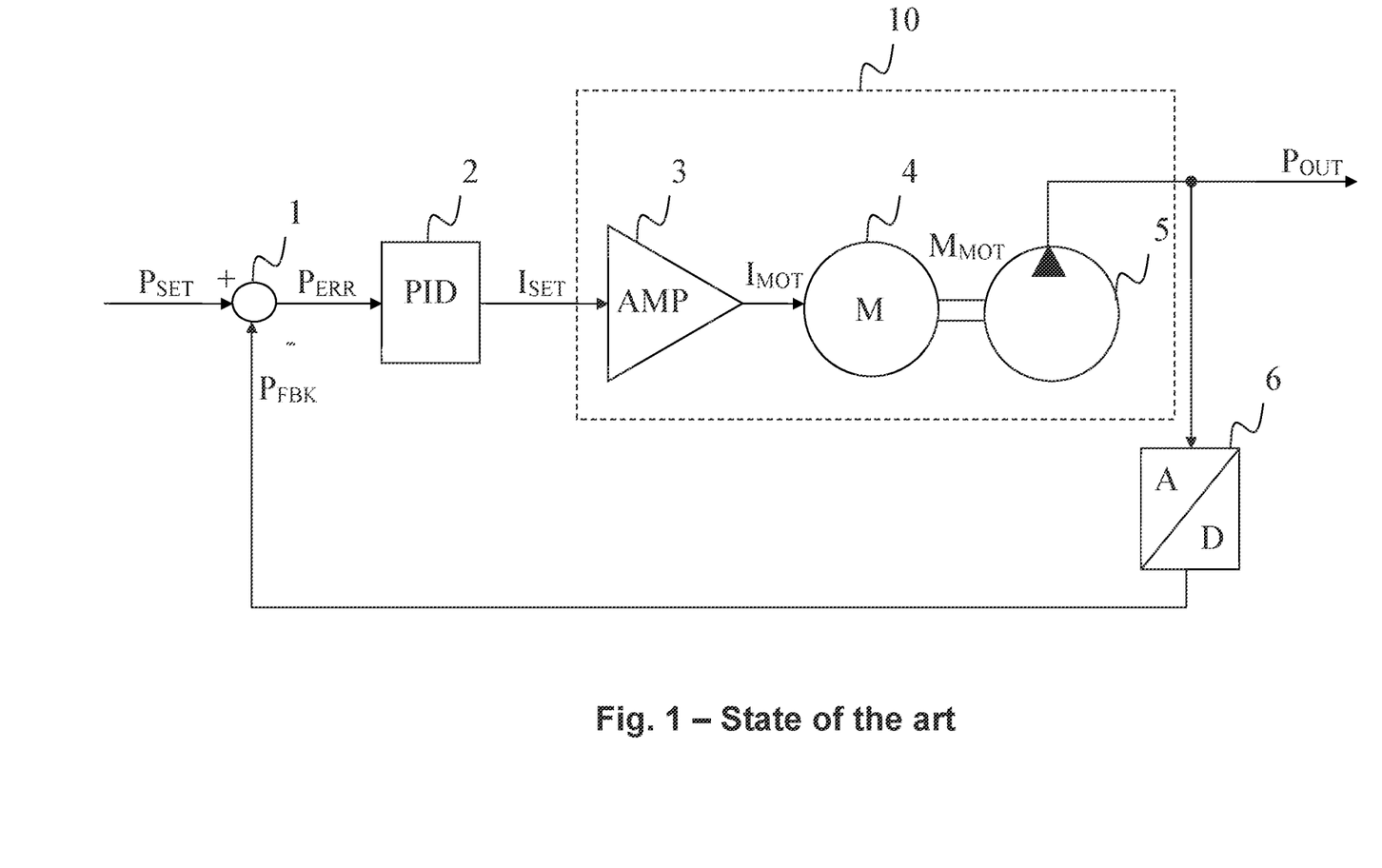
FIG. 1 illustrates a regulating system for the output pressure according to a known method.

FIG. 1 shows a regulating system for output pressure $P_{OUT}$ of a hydraulic drive system 10 according to a known method, as described for example in U.S. Pat. No. 6,379,119 B1. Hydraulic drive system 10 consists of a power amplifier 3, an electromotive drive 4 and a hydraulic pump 5. Hydraulic pump 5 provides an output pressure $P_{OUT}$ at its outlet, with which for example a pull-push device as illustrated for example in FIG. 7 in the embodiment of a deep draw device 8 is driven.

According to FIG. 1, regulating of output pressure $P_{OUT}$ occurs on the basis of an idealized linear relationship between the physical dimensions of pressure P, conveying volume $Q_P$ of hydraulic pump 5 determined by its size and a torque M by determining of set and actual values of a motor current $I_{MOT}$ as a control variable.

The following hydrostatic load torque applies for an ideal displacement pump as an example for a hydraulic pump 5 which is to be viewed without friction and losses at the sealing gap:

$$M_{POUT} = Q_P/(2*\pi)*P_{OUT} \quad (1)$$

with: $M_{POUT}$=torque at the hydraulic pump
$Q_P$=conveying volume of hydraulic pump per rotation
$P_{OUT}$=output pressure at the hydraulic pump.

According to FIG. 1, a setpoint pressure value $P_{SET}$ is compared in a comparator 1 with a pressure actual value $P_{FBK}$. The comparison result is an error pressure $P_{ERR}$ which is supplied to a regulating amplifier 2. Regulating amplifier 2 is designed as a PID-regulator. According to FIG. 1, a current setpoint value $1_{SET}$ is set as the control variable. This current setpoint value $1_{SET}$ is supplied to amplifier 3. Amplifier 3 produces motor current $I_{MOT}$ from current setpoint value $I_{SET}$. Motor 4 transfers torque $M_{MOT}$ resulting from $I_{MOT}$ to pump 5. Output pressure $P_{OUT}$ is detected by way of a sensor element and by way of an analog digital converter 6 is returned to comparator 1 as pressure actual value $P_{FBK}$. Amplifier 3 is generally suitable for synchronous or asynchronous motors. Motor current $I_{MOT}$ is a three-phase system.

The regulating system according to FIG. 1 is based on the following system considerations. Driving torque $M_{MOT}$ is opposed by hydrostatic load torque $M_{POUT}$ according to equation (1), a friction component of pump 5 and a rotor inertia of motor 4 as well as pump 5.

The following applies:

$$M_{MOT} = MPOUT + M_{FRICT} + J_{TOTAL}*\alpha) \quad (2)$$

with: $\alpha$=angular acceleration
$M_{FRICT}$=mechanical friction of pump due to size and type
$J_{TOTAL} = J_{MOTOR} J_{PUMP}$ as rotor inertia pump and motor For angular acceleration a of pump 5, the following arises from changing equation (2):

$$\alpha = (M_{MOT} - M_{POUT} - M_{FRICT})/(J_{MOT} + J_{PUMP}) \quad (3)$$

The following applies for rotational speed $\omega$ of pump 5:

$$\omega(t) = \int_0^\infty \alpha(t)*dt \quad (4)$$

For a user having a significant and variable volume flow $Q_{(t)}$ this arrangement is disadvantageous, since the necessary rotational speed w of pump 5 depends also on the actual required volume flow $Q_{(t)}$, for example for a stroke movement of the cylinder in order to support the draw cushion.

Figure 2:
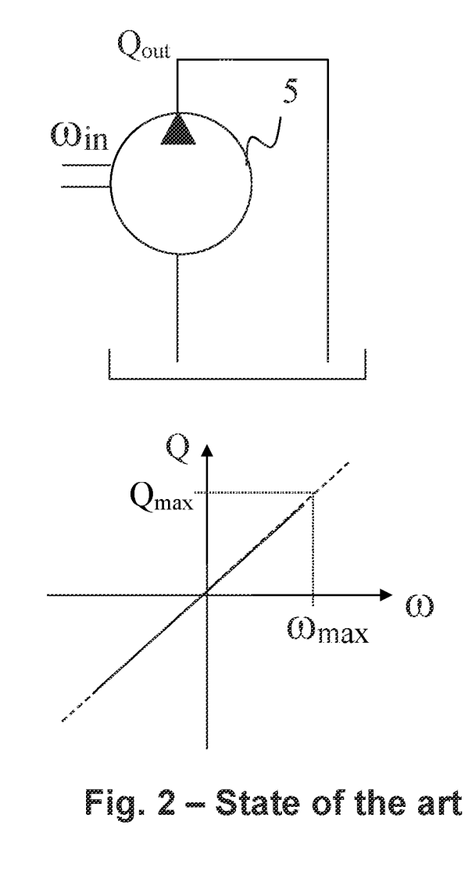
FIG. 2 illustrates a first schematic diagram for determining hydraulic pump parameters.
Figure 3:
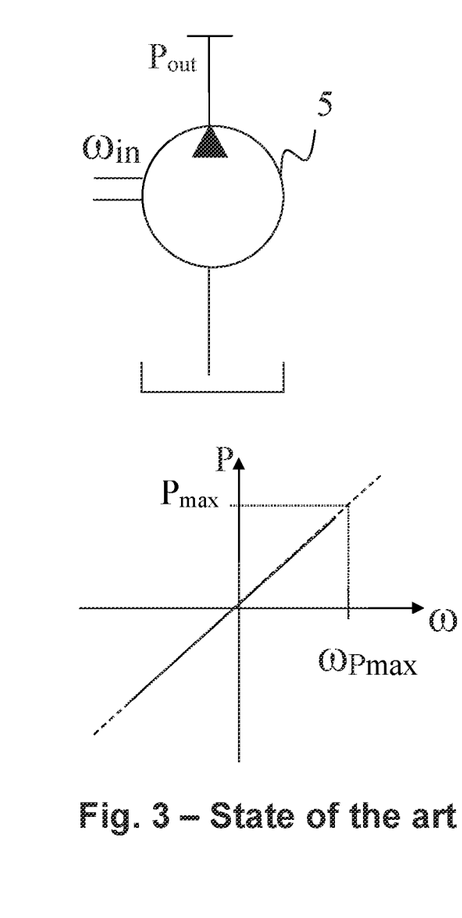
FIG. 3 illustrates a second schematic diagram for determining hydraulic pump parameters.

FIG. 2 and FIG. 3 are schematic diagrams used to determine hydraulic pump parameters which are used for regulating output pressure $P_{OUT}$ according to the invention.

FIG. 2 shows a characteristic curve of conveying volume Q in dependence of the rotational speed w of a fixed displacement pump 5 during pressureless operation. In a very good approximation volume flow Q is proportional to rotational speed w during pressureless operation. Typical maximum rotational speeds $\omega_{MAX}$ are 314 rad/s, in other words 3000 rotations per minute. Conveying volume $Q_{OUT}$ in pressureless operation is calculated as follows:

$$Q_{OUT}(\omega) = \omega_{IN} * Q_P \quad (5)$$

with: $Q_P$=conveying volume of pump 5 per rotation.

FIG. 3 shows a second schematic diagram used to determine hydraulic pump parameters. It illustrates a characteristics curve of pump 5, for example of a fixed displacement pump operating against blocked pressure output. Output pressure $P_{OUT}$ is calculated as follows:

$$P_{OUT}(w) = P_{MAX} * \omega_{IN}/\omega_{PMAX} \quad (6)$$

with: $P_{MAX}$=maximum pressure
$\omega_{IN}$=input rotational speed
$\omega_{PMAX}$=rotational speed at maximum pressure with blocked pressure output.

Used pumps 5, in particular piston or geared pumps are highly effective even under high pressure P. Thus, typically only a low rotational speed is $\omega_{PMAX}$ is necessary to produce maximum pressure $P_{MAX}$. For example, rotational speed $\omega_{PMAX}$ of a comparatively good pump 5 can be 12 rad/s (=120 rpm) at maximum pressure $P_{MAX}$, whereas rotational speed $\omega_{PMAX}$ of a comparatively inferior pump can be 31 rad/s (=300 rpm) at maximum pressure $P_{MAX}$.

As already mentioned, the pressure regulating system according to FIG. 1 considers only the pump characteristics according to FIG. 3. This results disadvantageously only in stable regulating of the pressure as long as no significant volume flow Q is removed. With a rotational speed value ω greater than a few hundred revolutions per minute the regulating system fails.

Figure 7:
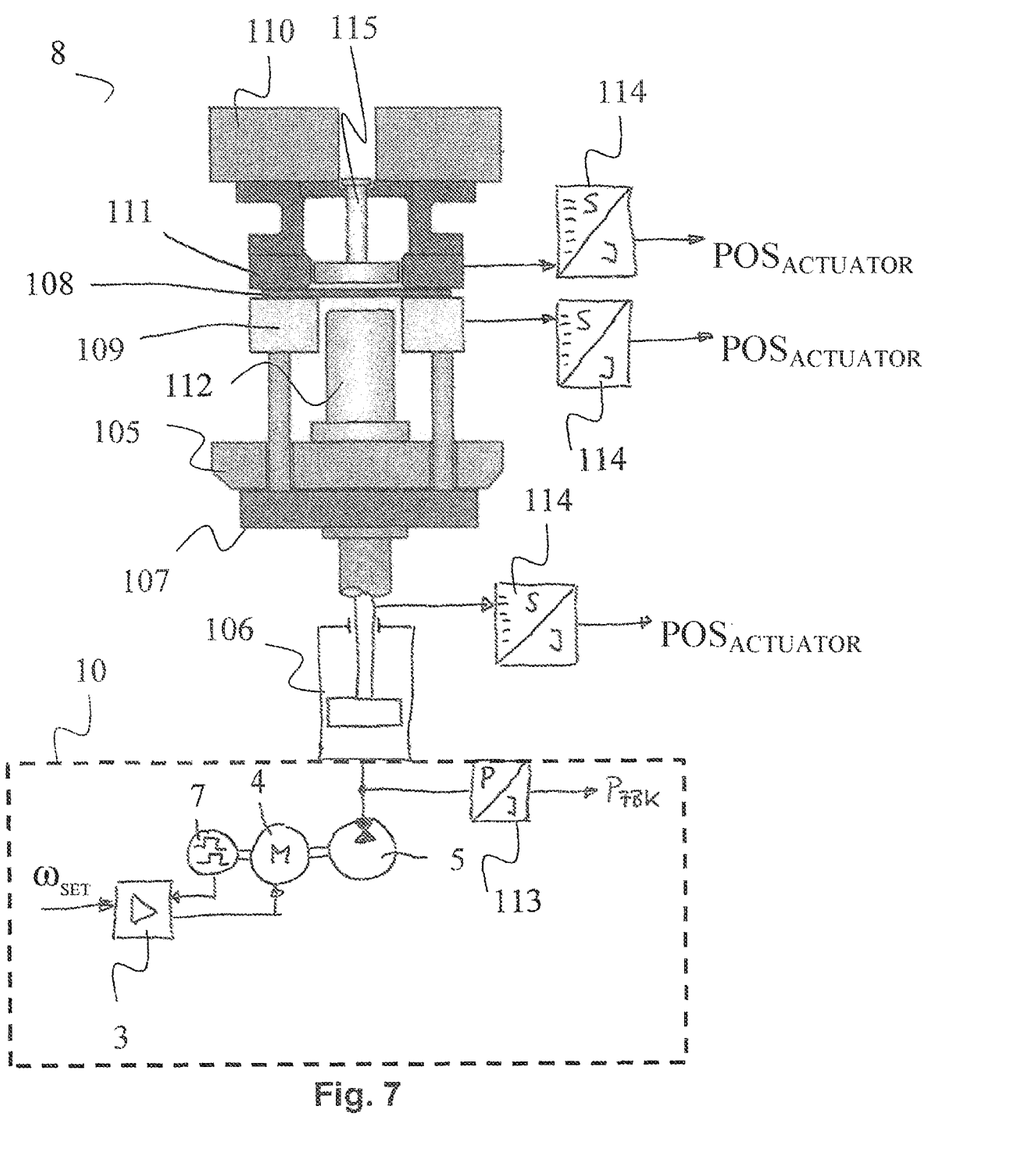
FIG. 7 illustrates a possible embodiment of a deep drawing device according to the current state of the art.

When using the inventive regulating system in a deep draw device 8 according to FIG. 7 attention must be paid that an element, for example the draw cushion moves as intended. Pump 5 must thereby be able to accept the displaced fluid volume and to remove volume flow Q. Pump 5 is designed such that the expected maximum volume flow $Q_{MAX}$ results in a maximum rotational speed of $\omega_{PMAX}$ (for example approx. 3000 rpm). The rotational speed regulating range which is to be controlled may be between very few revolutions per minute, resulting from the low rotational speed $\omega_{PMAX}$ at maximum pressure $P_{MAX}$ and several thousand revolutions per minute, resulting from the expected high volume flow $Q_{MAX}$.

In conventional control methods the control circuit can only be reliably parameterized for a fraction of this rotational speed control range, for example to a rotational speed range of 0 to a few hundred revolutions per minute. To illustrate the actual rotational speed range to several thousand revolutions per minute, sufficiently great control separations must be dealt with. This is not possible with the PID controls due to the time constants which have to be considered.

Figure 4:
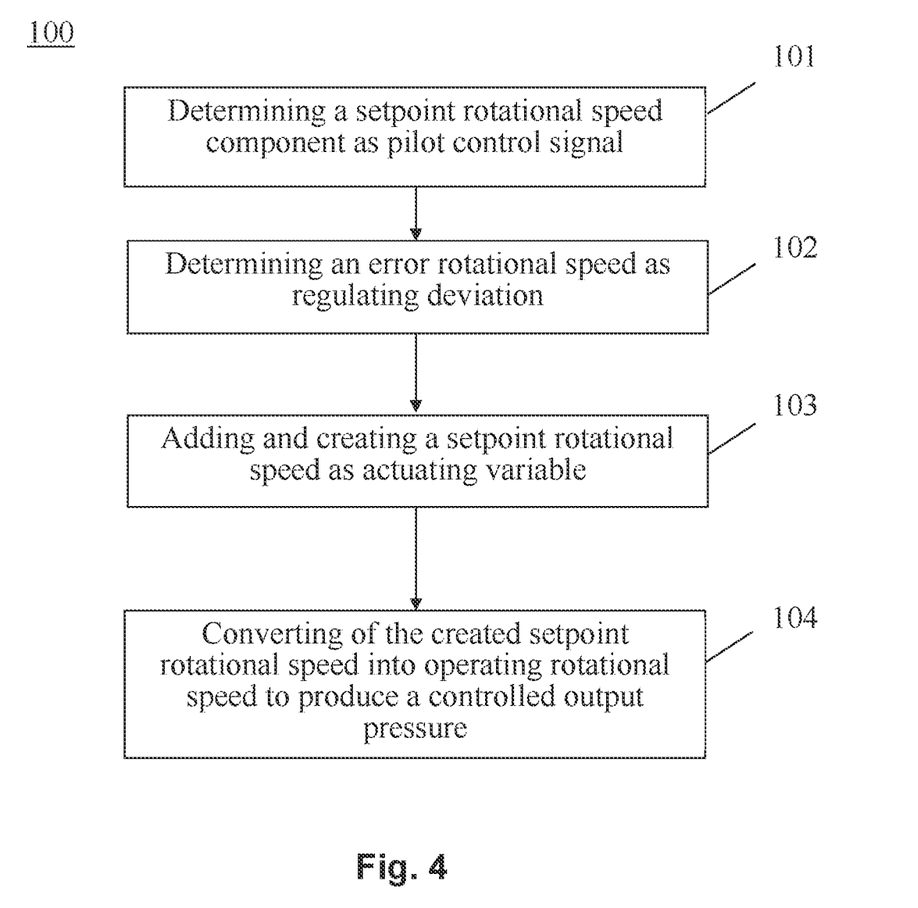
FIG. 4 illustrates a flow chart of an embodiment of a method according to the present invention.

FIG. 4 illustrates a flow chart of an embodiment of the method according to the present invention. Method 100 comprises process steps 101 to 104 as explained below. In step 101 a setpoint rotational speed main component $\omega_{SET1+2}$ of electromotive drive 4 is determined as pilot control signal. In step 102 an error rotational speed $\omega_{ERR}$ is determined as a control deviation from a comparison of an actual pressure value $P_{FBK}$ of hydraulic drive system 10 and a setpoint pressure value $P_{SET}$ of hydraulic drive system 10 and adjoining regulating amplifier 2. In step 103, adding of the determined setpoint rotational speed main component $\omega_{SET1+2}$ to the determined error rotational speed $\omega_{ERR}$ occurs in order to form a setpoint rotational speed $\omega_{SET}$ as the actuating variable in the inventive regulating system. In step 104 the created setpoint rotational speed $\omega_{SET}$ is converted into a rotational speed $\omega_{IN}$ of motor drive 4 for driving of hydraulic drive system 10 with the converted rotational speed to produce the regulated output pressure $P_{OUT}$ of hydraulic drive system 10 as the pressure actual value $P_{FBK}$.

Regulating method 100 according to the invention can be easily parameterized, is stable during operation and has substantial lower regulating deviation than the regulating method according to FIG. 1. In FIG. 4 the pressure control does not occur via torque $M_{MOT}$ of the driving motor, but via setpoint rotational speed $\omega_{SET}$ (or frequency f of the motor drive arising therefrom) as the actuating variable.

Figure 4A:
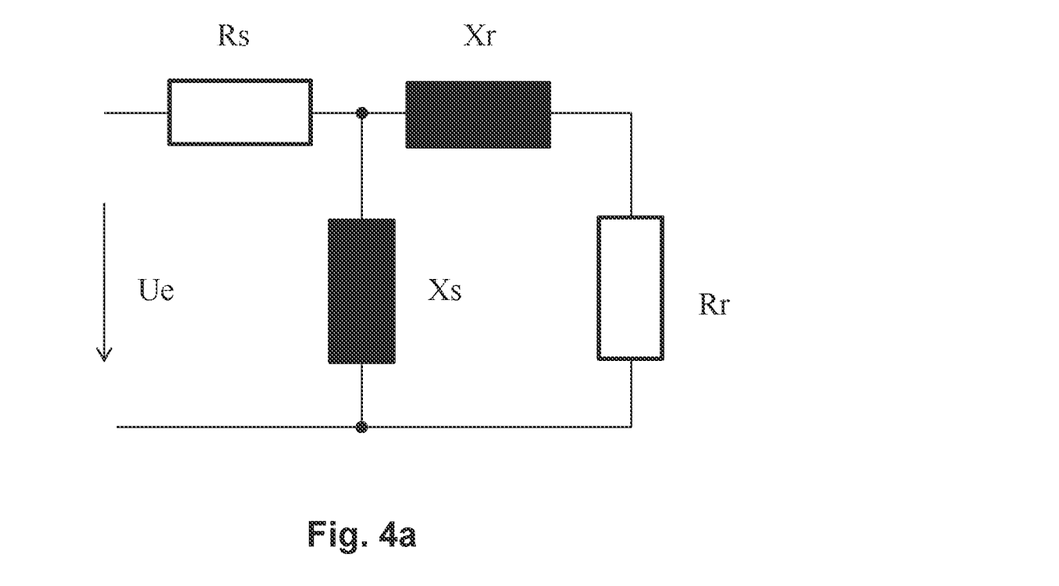
FIG. 4a illustrates an exemplary single line equivalent circuit diagram of a first motor drive for the method according to the present invention.

FIG. 4a illustrates an exemplary equivalent circuit diagram of one phase of a three-phase motor drive 4 (three-phase a.c. motor) for the method according to the invention with which inventive conversion step 104 and the therefrom resulting rotational speed regulation can be clarified. As mentioned, drive 4 is for example an asynchronous three-phase a.c. motor. For better understanding of the operation in a rotary speed regulating system of motor drive 4, consideration of the equivalent circuit diagram of the asynchronous motor is useful. This equivalent circuit diagram illustrates an electric circuit equivalent to that of motor drive 4 as is also seen for amplifier 3 with frequency converter 7.

On the left side of FIG. 4a the equivalent circuit diagram of the stator winding is illustrated. This consists of the ohmic resistor Rs, in particular a copper resistor and equivalent series resistance of the hysteresis losses and a reactance Xs of the stator winding-inductivity during asynchronous operation. On the right side of FIG. 4a, the equivalent circuit diagram of the rotor winding is illustrated. This consists of a reactance Xr of the rotor winding-inductivity and ohmic resistor Rr. Reactance Xr represents the resulting inductivity of an immobile motor. Effective resistor Rr of the rotor consists of the equivalent value of the effective power emitted by motor drive 4 and the ohmic resistance of the short circuit cage which is stepped up according to the square of the stator's number of turns. The equivalent value of the effective power changes with the change in torque M or respectively the load on motor drive 4.

In idle operation, that is in no-load operation of hydraulic drive system 10 the equivalent circuit diagram of motor drive 4 consists essentially of resistors Rs and Xs. The current $I_{MOT}$ consumption during idle operation is almost equivalent to the rated current. With increasing load, in other words with the buildup in output pressure $P_{MAX}$ in hydraulic drive system 10 the active current increases because of resistance Rr. The phase angle between current $I_{MOT}$ and voltage $U_{MOT}$ reduces by almost φ=90° to lesser values.

The load dependent active current produces a drop in voltage at resistor Rr, but only an insignificantly greater drop in voltage at resistor Rs. Consequently, the losses increase quicker with increasing load in the rotor than in the stator. Resistors Rs and Rr cause increasing losses with the square of the current consumption. Therefore, the efficiency of motor drive 4 decreases with increasing load.

In inverter operation, reactance Xs becomes increasingly less with decreasing frequency $f_{MOT}$. When adhering to the rated current the voltage delivered by frequency converter 7 must therefore drop. With this, the ratio of voltage divider Rs relative to Xs becomes less favorable and leads to increasing losses relative to the available motor power. Frequency converter 7 can possibly detect the voltage divider ratio Rs/Rr on its own.

A (non-illustrated) frequency converter 7 now enables rotational speed w to be adjusted infinitely from almost zero to the rated speed without torque $M_{MOT}$ dropping in doing so (basic adjustment range). Motor drive 4 can also be operated via rated rotational frequency. However, the delivered torque $M_{MOT}$ then drops, since the operating voltage can no longer be adapted to the increased frequency.

FIG. 4a shows the application of torque control for asynchronous motors, however the invention is not limited to same. The regulating system can also be used with synchronous motors, for example three phase synchronous motors.

Figure 4B:
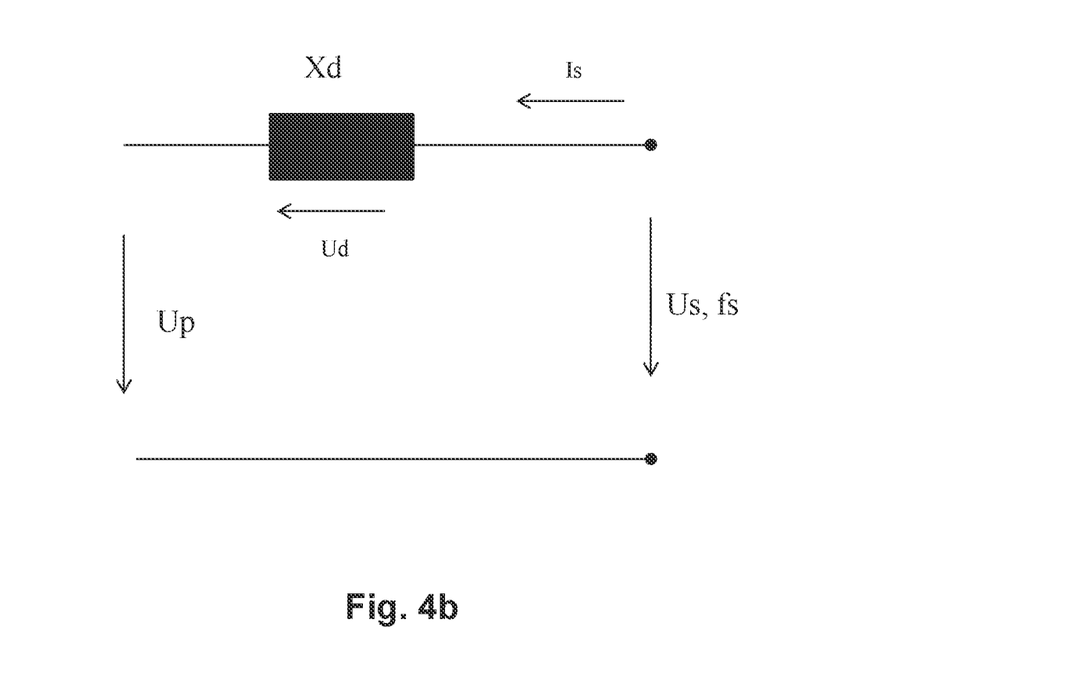
FIG. 4b illustrates an exemplary single line equivalent circuit diagram of a second motor drive for the method according to the present invention.

FIG. 4b illustrates an exemplary equivalent circuit diagram of one phase of a three-phase motor drive 4 (three phase a.c. current motor) for the inventive method with which inventive conversion step 104 and the therefrom resulting torque control can be clarified. According to FIG. 4b, motor drive 4 is for example a synchronous three phase a.c. current motor. The equivalent circuit diagram according to FIG. 4b illustrates an electrical circuit, equivalent to motor drive 4 as is also seen for amplifier 3 with frequency converter 7.

For the synchronous motor to be able to operate as an electromotive drive 4—in other words as a three phase a.c. synchronous motor—an energizing field is necessary in the rotor circuit so that due to a direct current energized rotor winding (field winding) or a permanent magnet a magnetic field (energizing field) is produced which in the individual branches of the stator winding induces a stator voltage Us. Moreover, electric energy must be supplied via the stator winding, so that the three phase a.c. synchronous motor can deliver torque $M_{MOT}$ (see equation 2).

Below is a brief description of the function of the synchronous motor illustrated in FIG. 4b in motor operation. The synchronous motor idles in the fixed network. Due to pump 5 a load occurs on the motor shaft. Motor 4 would reduce its rotational speed ω, however motor 4 now consumes electric power and stator current, Is, illustrated in FIG. 4 increases. Now, a motor torque $M_{MOT}$ becomes effective which counteracts load torque $M_{LOAD}$. Stator current Is causes a differential voltage Ud at the synchronous reactance Xd. The inductive reactance of the stator winding and its ohmic resistance can herein be neglected. Due to voltage drop Xd, a stator current Id dependent rotor displacement angle forms which acts against the rotational direction in the motor operation. Thus, rotor voltage Up shifts toward line voltage US with the rotor angle against the rotational direction. The motor continues to run with synchronous rotational speed ω. No slippage—as is the case with the asynchronous motor—occurs.

Figure 5:
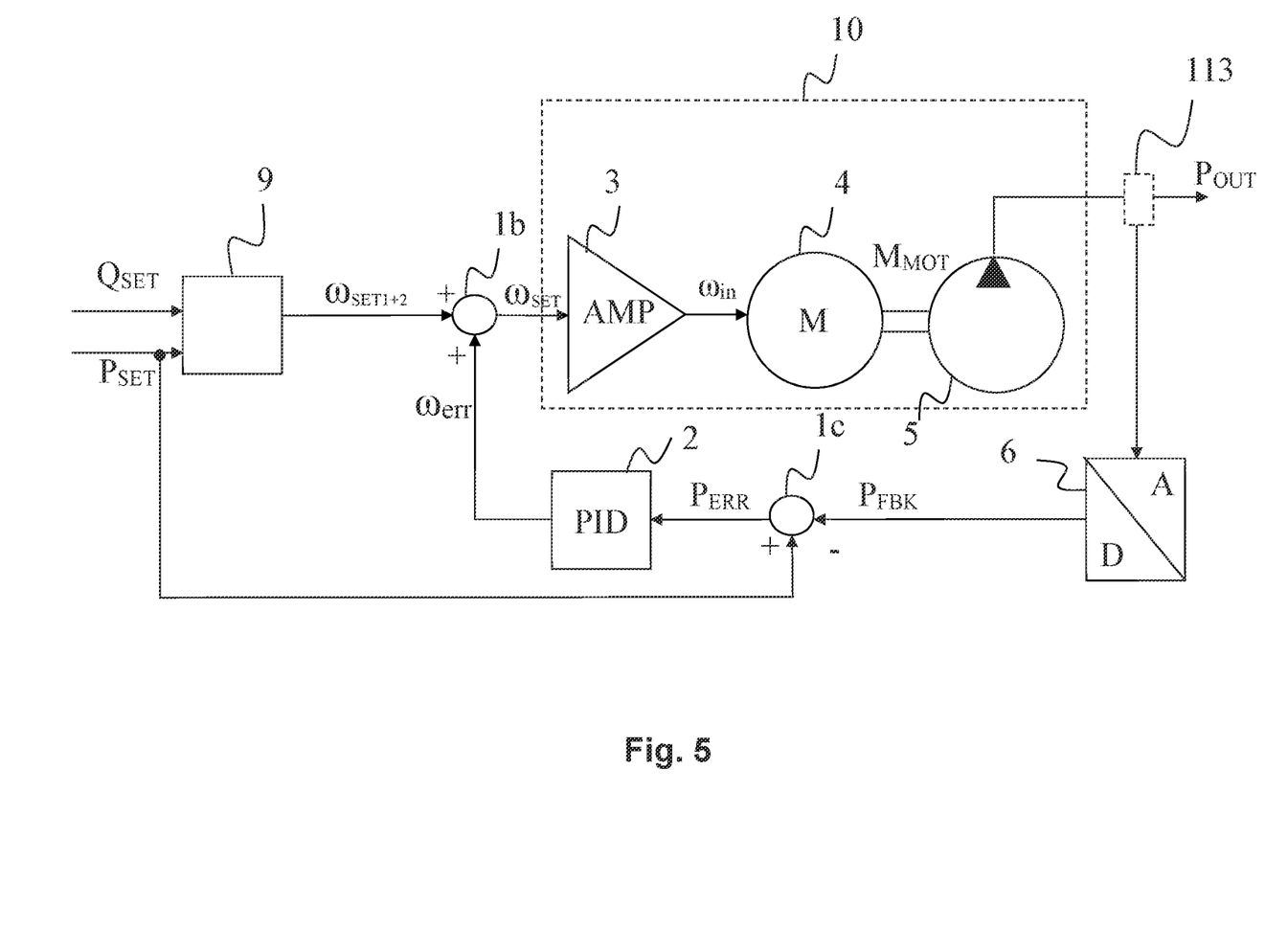
FIG. 5 illustrates a first design example of a block diagram of regulating the output pressure according to the present invention.

FIG. 5 illustrates a first embodiment of a block diagram of regulating an output pressure $P_{OUT}$ system according to the present invention. Herein, the conveying volume setpoint $Q_{SET}$ is fed into a computing unit 9. Computing unit 9 therefrom calculates a setpoint rotational speed main component $\omega_{SET1+2}$ as pilot control signal. Setpoint rotational speed main component $\omega_{SET1+2}$ of setpoint rotational speed $\omega_{SET}$ is generated herein advantageously without influence of disturbances. The interactions already discussed in FIG. 2 and FIG. 3 are advantageously used for this purpose, which will be discussed in more detail in regard to FIG. 6. In addition, an actual pressure value $P_{FBK}$ is obtained from a pressure sensor 113 and converted by way of an AD-converter 6 into a digitized sensor output value for determination of output pressure $P_{OUT}$; compared in comparator 1c with setpoint pressure value $P_{SET}$ and the error rotational speed $\omega_{ERR}$ supplied to a PID regulating amplifier 2.

Setpoint rotational speed main component $\omega_{SET1+2}$ is added in adder 1b to error rotational speed $\omega_{ERR}$ thus obtaining a setpoint rotational speed $\omega_{SET}$ as the actuating variable. Thus, actuating variable for the motor is no longer motor current $I_{MOT}$ but motor rotational speed $\omega_{SET}$. In an actuator movement this corrective signal $\omega_{ERR}$ has a small part in the rotational speed control. The part is considerably less than 50%, preferably less than 20%. This permits regulating of the hydraulic drive system in a robust and at the same time accurate manner.

With the inventive regulating method, the lossy and non-linear characteristics of hydraulic drive system 10 as well as its compression and decompression effects are considered. The therefore necessary corrective value—error rotational speed $\omega_{ERR}$—has a small component compared to the total rotational speed range of pump 5. This error rotational speed (DERR can now be easily and robustly determined with an additional component from a simple PID-regulator. The following applies:

$$\omega_{ERR}=PID(P_{SET}-P_{FBK}) \qquad (7)$$

With: PID=function of a PID regulator 2
$P_{SET}$=setpoint pressure
$P_{FBK}$=actual pressure value Corrective signal $\omega_{ERR}$ does not have to cover the entire rotational speed range of pump 5, since it is added to setpoint rotational speed main component $\omega_{SET1+2}$. Therefore, only the deviation between the simplified linear model and the actual system has to be regulated.

Hydraulic drive system 10 according to FIG. 5 includes a power amplifier 3 and a frequency converter 7 in order to produce an input rotational speed $\omega_{IN}$ for motor drive 4 from setpoint rotational speed $\omega_{SET}$ with which motor drive 4 is driven in order to drive hydraulic pump 5 and in order generate output pressure $P_{OUT}$.

Figure 6:
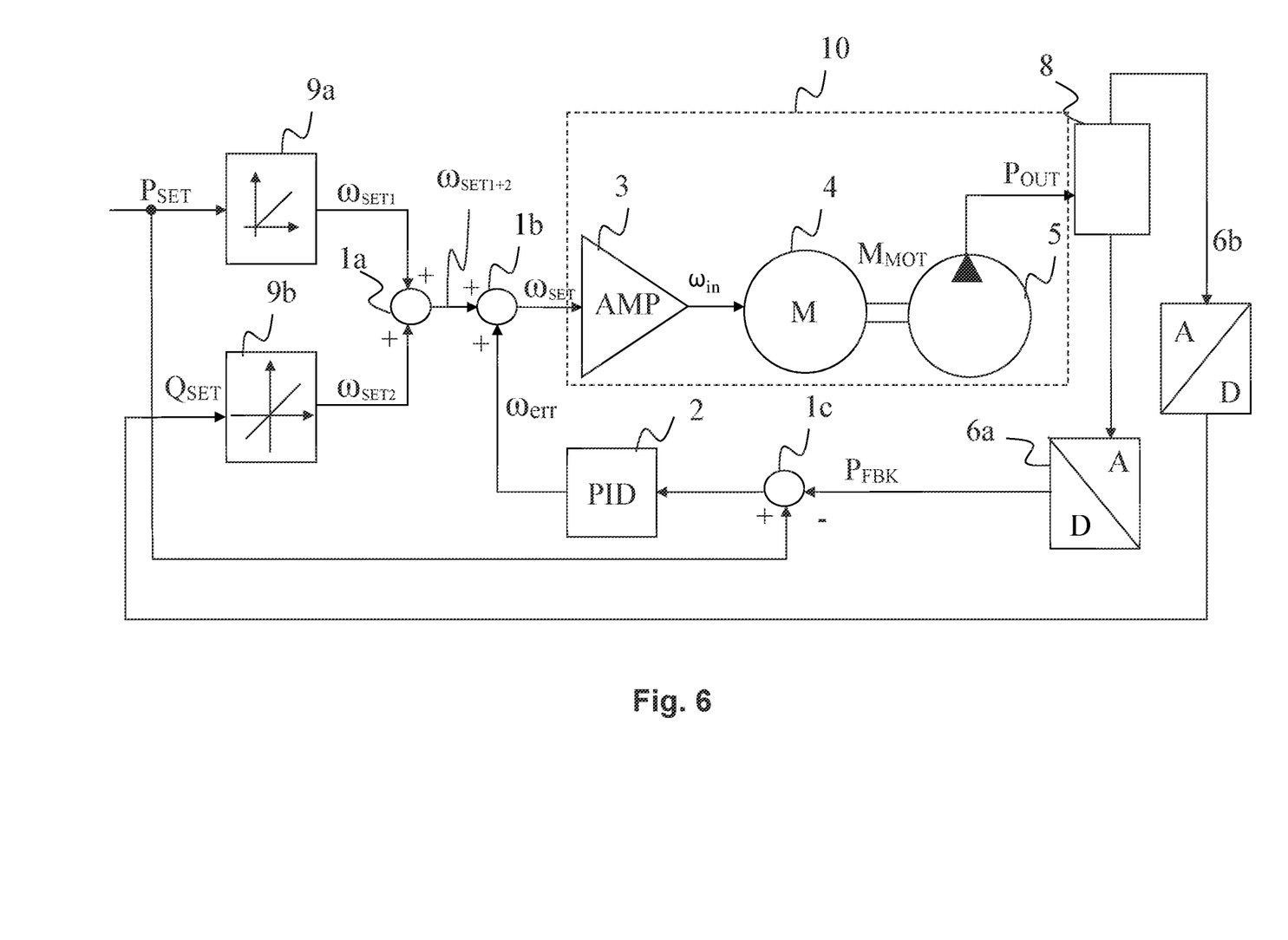
FIG. 6 illustrates a second embodiment of a block diagram of regulating the output pressure according to the present invention.

FIG. 6 illustrates a second design example of a block diagram for regulating output pressure $P_{OUT}$ according to the present invention. In contrast to the first design example according to FIG. 5, computing unit 9 is shown in more detail and in addition a consuming device 8 (for example a cylinder) is indicated. The following description is based on the previous description of FIG. 5 which will not be repeated here.

According to FIG. 6, a first setpoint rotational speed component $\omega_{SET1}$ is formed from setpoint pressure $P_{SET}$. For this, the relationship illustrated in equation (6) and FIG. 3 is applied in a computing unit 9a. The following applies:

$$\omega_{SET}=P_{SET}/P_{MAX}*\omega P_{MAX} \qquad (8)$$

The algebraic sign of first setpoint rotational speed component $\omega_{SET1}$ is positive, in order to build up output pressure $P_{OUT}$.

A second setpoint rotational speed component $\omega_{SET2}$ is formed from volume flow $Q_{SET}$. For this, the relationship illustrated in equation (5) and FIG. 2 is applied in a computing unit 9a. The following applies:

$$\omega_{SET2}=Q_{SET}/Q_P \qquad (9)$$

Second setpoint rotational speed component $\omega_{SET2}$ is necessary in order to accept volume flow Q caused by pump 5 due to the movement of the actuator. The algebraic sign of second setpoint rotational speed component $\omega_{SET2}$ can be positive or negative, depending on the direction of movement in actuator 8. For example during the draw process (see FIG. 8, time span from $t_{CP}$ to $t_{BDC}$) the algebraic sign is negative. In this time span pump 5 operates as a hydrometer and must accept fluid from the cylinder of the actuator. If the pump were to be driven only with this second setpoint rotational speed component $\omega_{SET2}$ then no output pressure $P_{OUT}$ would be generated.

Both setpoint rotational speed component $\omega_{SET1}$ and $\omega_{SET2}$ are added in adder 1a.

As already described in FIG. 5, corrective rotational speed $\omega_{ERR}$ is formed from the difference between setpoint pressure value $P_{SET}$ and pressure actual value $P_{FBK}$—determined via pressure sensor 113 (not show in FIG. 6)—by way of comparator 1c and PID regulator 2. Setpoint rotational speed $\omega_{SET}$ is then obtained at the output of adder 1b as follows:

$$\omega_{SET1} = \omega_{SET2} + \omega_{ERR} \quad (10)$$

$\omega_{SET1}$=component for volume flow
$\omega_{SET2}$=component for pressure build-up
$\omega_{ERR}$=component for compensating of non-linear malfunctions The now obtained setpoint rotational speed $\omega_{SET}$ is transferred to amplifier 3 as actuating variable, as descried in FIG. 5.

In FIG. 6 it is already indicated that a device 8 as a consuming device is connected to pump 5. This device 8 comprises an actuator which is driven by hydraulic drive system 10. The actuator is for example a cylinder, supporting a draw cushion as an element in a deep draw device, as illustrated for example in FIG. 7. A sensor element (not illustrated) on or in the actuator detects pressure actual value $P_{FBK}$, which is provided by way of a first AD converter 6a to comparator 1c.

In addition it is indicated in FIG. 6 that volume flow $Q_{SET}$ is removed from device 8. The relevant value is provided by way of a second AD converter 6b to computing unit 9b in order to determine second setpoint rotational speed component $\omega_{SET2}$. This volume flow $Q_{SET}$ is detected by a sensor element (not illustrated) that is mounted on an additional element, for example on the upper or lower tool of the deep draw device in FIG. 7, wherein the additional element influences hydraulic drive system 10.

Setpoint volume flow $Q_{SET}$ can for example be determined simply from an actuator speed and an effective actuator surface or an element speed and an effective element surface. The speed signal can for example be determined by way of a differentiation of a path detected by a sensor element. From the first derivation of the position of the actuator or of the element the speed of the additional actuator may for example be deduced. The following applies:

$$V_{ACTUATOR} = d/dt\, POS_{ACTUATOR} \quad (11)$$

With: $V_{ACTUATOR}$=speed of actuator/element
$POS_{ACTUATOR}$=position of actuator/element
Volume flow $Q_{SET}$ then is calculated:

$$Q_{SET} = V_{ACTUATOR} * A_{Wirk} \quad (12)$$

With: $A_{Wirk}$=effective surface of actuator/element

With determined volume flow $Q_{SET}$, second setpoint rotational speed component $\omega_{SET2}$ can then be determined according to equation (9).

In an additional embodiment, volume flow $Q_{SET}$ can also result directly from the distance/time specification of a primary movement control. For example, the speed of an element in device 8, for example the upper tool and/or the draw cushion is known to a primary CNC control. With a crank mechanism for the upper tool the speed can be calculated for example from the angle position and angle speed of the crank drive. This CNC can thus deliver operand $V_{ACTUATOR}$ or the calculated result $Q_{SET}$ directly to computing unit 9.

FIG. 7 illustrates one design example of a device 8 in FIG. 6 according to the current state of the art. Device 8 is for example a deep draw device which is connected with hydraulic drive system 10 and is driven at least partially by same.

A support 105 is provided in device 8 shown in FIG. 7. A draw cushion table 107 is provided as an element in order to arrange a material 108 on its surface. Arranged material 108 is formed by way of device 8, for example in a drawing process in order to produce a component therefrom. For this purpose, material 108 is clamped in a material retainer 109. Draw cushion table 107 is moved by way of a hydraulic cylinder 106, causing a drawing punch 112 to move in vertical direction. A position sensor element 114 is provided to sense position $POS_{ACTUATOR}$ of draw cushion table 107. Hydraulic cylinder 106 is moved in vertical direction by way of hydraulic drive system 10 consisting of amplifier 3, motor 4 and pump 5, and thus moves draw cushion table 107 and thereby also drawing punch 112. An additional position sensor element 114 is provided to detect position $POS_{ACTUATOR}$ of hydraulic cylinder 106. A pressure produced by pump 5 is detected by pressure sensor 113 in order to detect the actual pressure value $P_{PFK}$.

An additional element 110—in this case an upper tool—is moved in upward and downward direction in FIG. 7 by way of a crank mechanism and by way of a non-illustrated drive device. Additional element 110 includes for example a die 111 and a plunger 115. An additional position sensing element 114 is provided in order to detect position $POS_{ACTUATOR}$ of additional element 110, for example die 111.

Figure 8:
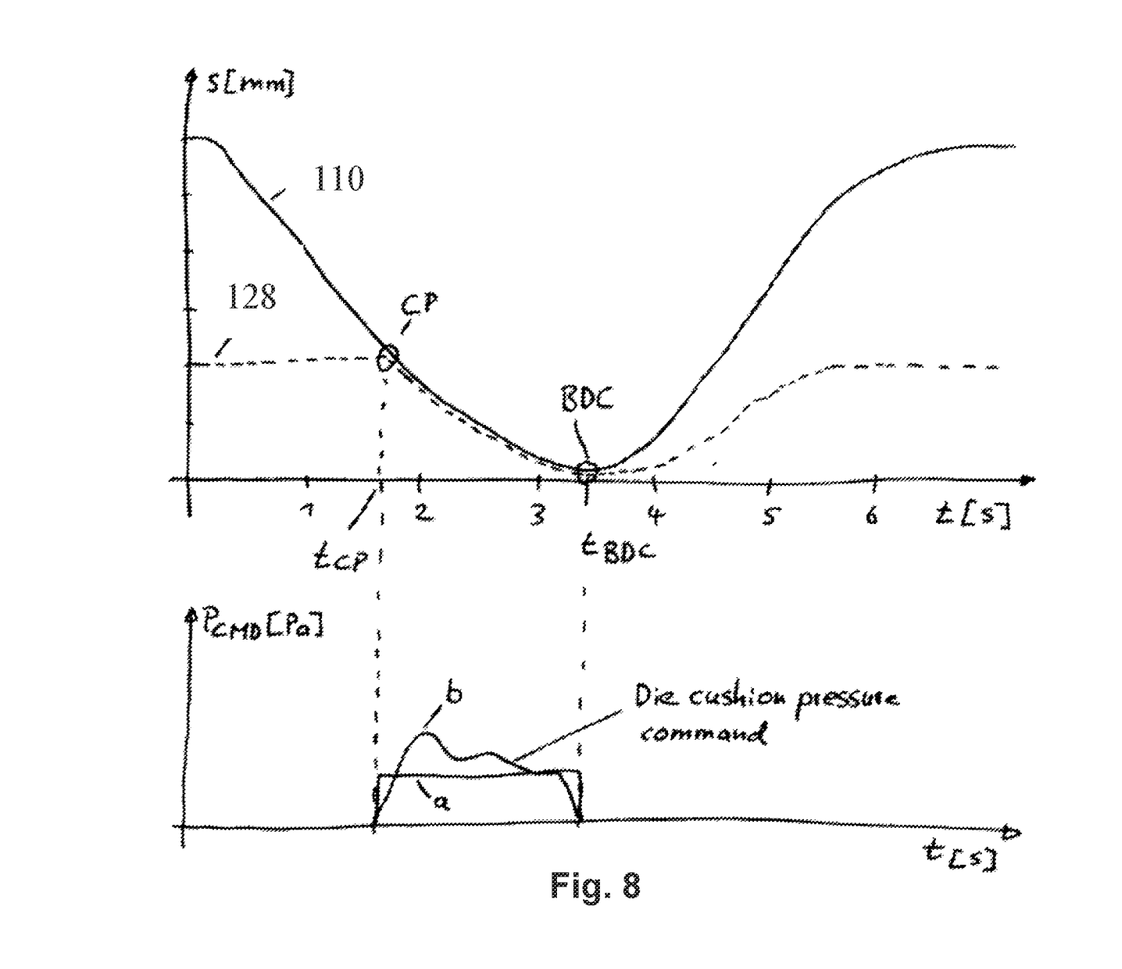
FIG. 8 illustrates exemplary signal progressions for regulating the output pressure according to the present invention by use of actuator parameters.

The mode of operation of the device is explained in the description of FIG. 8. In regard to the deep drawing process and relevant technical arrangements and dynamic effects we refer you to reference book ("Handbuch der Umformtechnik", especially chapter 4. (Handbook for forming technology), Springer Publishing, edition 1, edited by Schuler GmbH.).

FIG. 8 shows exemplary signal curves for regulating output pressure $P_{OUT}$ according to the invention by using actuators and their sensory data.

FIG. 8 illustrates a distance/time progression of additional element 110—also referred to as upper tool or slide—and the distance/time progression of element 107—also referred to as draw cushion or die cushion, abbreviated as DC.

Additional element 110 can for example be moved up and down by way of the crank mechanism. In the case of a crank mechanism additional element 110 follows the progression of a hyperbolic function. With alternative servo-electric or servo-hydraulic drives additional element 110 can be any desired distance/time relationship.

From the curve in FIG. 8 it can be easily seen at the top that element 107 is waiting on a collision position CP and that this position initially does not change. As soon as additional element 110 impacts element 107 in collision position CP at time point $t_{CP}$ due to the crank mechanism, additional element 110 determines the distance/time behavior of element 107 to the point of a lower dead center BDC to an additional time point $t_{BDC}$. In the time span between the two points in time $t_{CP}$ and $t_{BDC}$ the drawing process of material 108 occurs. After additional element 110 is moved upward by the crank mechanism and thereby lifts off element 107 the controlled non-critical reverse movement of element 107 back to collision point CP occurs, so that after interim removal of the manufactured/formed component a new material 108 can be positioned.

In the lower signal curve in FIG. 8, setpoint pressure value $P_{SET}$ for regulating output pressure $P_{OUT}$ according to the invention is also shown for the drawing process. According to first progression a, this can be a constant pressure or any other desired progression b, for example according to a look-up table LUT. This is compared with actual pressure value $P_{PFK}$ that is captured by way of pressure sensor 113. It should be appreciated that the volume flow setpoint $Q_{SET}$ of the hydraulic drive system 10 may be determined by use of at least one parameter of an actuator and/or element 128 or an element 110 which is driven by the hydraulic drive system 10 or an element 110 which influences the hydraulic drive system 10.

Within the scope of the invention, all described and/or drawing and/or claimed elements can be combined with each other as desired.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

COMPONENT IDENTIFICATION LIST AND ABBREVIATIONS 1a, b adder
1c Comparator
2 PID regulator
3 Amplifier
4 motor/motoric drive
5 pump
6a, b analog digital converter
7 frequency converter
8 device for deep drawing with hydraulic actuator
9a, b computing unit 9
10 hydraulic drive system
100 method
101-104 process steps
105 support
106 cylinder
107 draw cushion table
108 material, blank
109 material retainer
110 additional element—upper tool
111 die
112 drawing punch
113 pressure sensor
114 sensor element for position detection
115 plunger
$A_{WRK}$ effective surface of actuating cylinder
a constant setpoint pressure during drawing process
b optional setpoint pressure during drawing process
BDC lower dead center of upper tool
CP collision point between upper tool and draw cushion
DC draw cushion
$I_{MOT}$ motor current
$I_S$ stator current
$I_{SET}$ current setpoint value
$J_{MOTOR}$ rotor inertia motor
$J_{PUMP}$ rotor inertia pump
$J_{TOTAL}$ total rotor inertia
$M_{FRICT}$ mechanical friction of pump
$M_{MOT}$ motor torque
$M_{POUT}$ torque of pump, hydrostatic load torque
$P_{ERR}$ error pressure
$P_{FBK}$ actual pressure value
$P_{MAX}$ maximum pressure
$P_{OUT}$ output pressure
$P_{SET}$, $P_{CMD}$ setpoint pressure value
$Q_{OUT}$ output conveying volume of pump during operation
$Q_P$ conveying volume of pump per revolution
$Q_{SET}$ setpoint conveying volume QSET
Rs stator winding—effective resistance
Rr rotor winding—effective resistance
s travel path of additional actuator
t time
$t_{BDC}$ time point below dead center
$t_{CP}$ time point collision point
Ud differential voltage
Us stator voltage
Up rotor voltage
$A_{ACTUATOR}$ speed of additional actuator
Xs stator winding—reactance
$X_r$ rotor winding—reactance
$X_d$ reactance synchronous motor—synchronous reactance
α angular acceleration
$\omega_{ERR}$ error rotational speed of pump to compensate for non-linear, malfunctions
$\omega_{IN}$ input rotational speed
$\omega_{MAX}$ maximum rotational speed of pump
$\omega P_{MAX}$ rotational speed of pump to produce maximum pressure against blocked pressure output
$\omega_{SET}$ setpoint rotational speed of pump
$\omega_{SET1}$ first setpoint rotational speed component for pressure build-up of pump
$\omega_{SET2}$ second setpoint rotational speed component for volume flow of pump
$\omega_{SET1+2}$ setpoint rotational speed main component as pilot control signal

What is claimed is:

1. A method for regulating output pressure of a hydraulic drive system by using a rotational speed as an actuating variable, wherein the hydraulic drive system has a hydraulic pump and a motor drive which drives the hydraulic pump, the method comprising:
    determining a setpoint rotational speed main component of the motor drive as a pilot control signal;
    determining an error rotational speed as a regulating deviation from a comparison of an actual pressure value of the hydraulic drive system and a setpoint pressure value of the hydraulic drive system and an adjoining regulating amplifier;
    adding the determined setpoint rotational speed main component to the determined error rotational speed to create a setpoint rotational speed as the actuating variable; and
    converting the created setpoint rotational speed into an input rotational speed of the motor drive to drive the hydraulic drive system at the converted rotational speed in order to generate regulated output pressure of the hydraulic drive system which represents an actual pressure value, wherein the determined setpoint rotational speed main component comprises a first setpoint rotational speed component and a second setpoint rotational speed component, and wherein the second setpoint rotational speed component is calculated from a volume flow setpoint and a conveyed volume flow parameter of the hydraulic drive system.

2. The method according to claim 1, wherein the first setpoint rotational speed component is calculated from the setpoint pressure value, a maximum pressure of the hydraulic pump, and a rotational speed parameter of the motor drive to produce the maximum pressure.

3. The method according to claim 2, wherein the volume flow setpoint of the hydraulic drive system is determined from at least one parameter of an actuator coupled to and driven by the hydraulic drive system and/or a first element which is driven by the hydraulic drive system or a second element which influences the hydraulic drive system.

4. The method according to claim 3, wherein the second element comprises a die and a plunger.

5. The method according to claim 1, further comprising a sensor element configured for sensing at least one parameter, wherein the volume flow setpoint of the hydraulic drive system is determined from the at least one parameter.

6. The method according to claim 1, wherein an algebraic sign of the first setpoint rotational speed component contrasts with an algebraic sign of the second setpoint rotational speed component.

* * * * *

UNITED STATES PATENT AND TRADEMARK OFFICE
CERTIFICATE OF CORRECTION

PATENT NO.      : 11,002,266 B2
APPLICATION NO. : 16/779109
DATED           : May 11, 2021
INVENTOR(S)     : Bert Brahmer It is certified that error appears in the above-identified patent and that said Letters Patent is hereby corrected as shown below:

In the Specification

Column 6
At Line 58, please delete "$J_{MOTOR}J_{PUMP}$", and substitute therefore --$J_{MOTOR} + J_{PUMP}$--; and
At Line 59, please delete "acceleration a", and substitute therefore --acceleration $\alpha$--.

Column 7
At Line 1, please delete "speed w", and substitute therefore --speed $\omega$--;
At Line 8, please delete "speed w", and substitute therefore --speed $\omega$--; and
At Line 11, please delete "speed w", and substitute therefore --speed $\omega$--.

Column 9
At Line 12, please delete "speed w", and substitute therefore --speed $\omega$--.

Column 10
At Line 27, please delete "(DERR", and substitute therefore --$\omega_{ERR}$--; and
At Line 58, please delete "$\omega_{SET}$", and substitute therefore --$\omega_{SET1}$--.

Signed and Sealed this
Twenty-first Day of March, 2023

Katherine Kelly Vidal
*Director of the United States Patent and Trademark Office*